Figure 1:
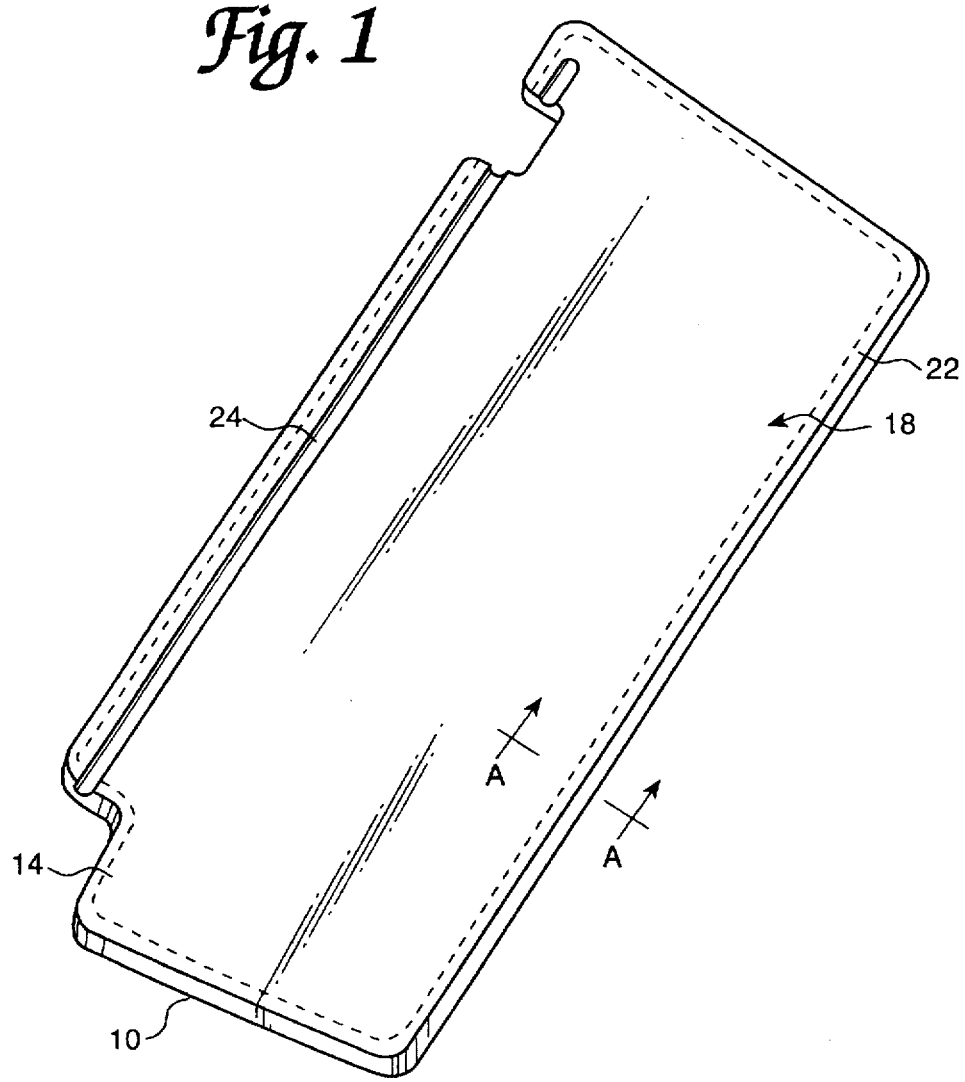

United States Patent [19]
Mailänder et al.

[11] Patent Number: 5,678,879
[45] Date of Patent: Oct. 21, 1997

[54] SUN VISOR FOR VEHICLES

[75] Inventors: Ralf Mailänder, Hanover; Thomas Eickhoff, Langquaid, both of Germany

[73] Assignee: Benecke-Kaliko AG, Hanover, Germany

[21] Appl. No.: 502,427

[22] Filed: Jul. 14, 1995

[30] Foreign Application Priority Data

Jul. 14, 1994 [DE] Germany .................. 44 24 663.3

[51] Int. Cl.[6] .................................................. B60J 3/00
[52] U.S. Cl. .................................. 296/97.1; 296/97.9
[58] Field of Search .................. 296/97.1, 97.9, 296/97.12

[56] References Cited

U.S. PATENT DOCUMENTS

| | | | |
|---|---|---|---|
| 4,458,938 | 7/1984 | Viertel et al. | 296/97.1 |
| 4,982,991 | 1/1991 | Lawassini et al. | 296/97.1 |
| 5,031,951 | 7/1991 | Binish | 296/97.1 |
| 5,108,143 | 4/1992 | Miwa | 296/97.1 |
| 5,148,588 | 9/1992 | Prillard | 296/97.1 X |
| 5,295,725 | 3/1994 | Jones | 296/97.1 |
| 5,308,136 | 5/1994 | Schwarz et al. | 296/97.1 |

FOREIGN PATENT DOCUMENTS

| | | |
|---|---|---|
| 0 291 854 A2 | 11/1988 | European Pat. Off. . |
| 0 468 810 A1 | 1/1992 | European Pat. Off. . |
| 0 577 828 A1 | 1/1994 | European Pat. Off. . |
| 2 595 072 | 9/1987 | France . |
| 1149260 | 5/1963 | Germany . |
| 2102917 | 8/1972 | Germany . |
| 3614481 | 11/1987 | Germany . |
| 9110948 U | 11/1991 | Germany . |
| 61-181721 | 8/1986 | Japan . |

*Primary Examiner*—Joseph D. Pape
*Attorney, Agent, or Firm*—Cushman Darby & Cushman IP Group of Pillsbury Madison & Sutro LLP

[57] ABSTRACT

A sun visor for vehicles is described. The sun visor consists of a substrate with a foamed plastic core, which has hollow spaces for receiving inserts, such as the sun visor shaft, pivot bearing, mirror and has an exterior decorative layer. The substrate consists of two substrate parts of a panel-shaped semi-finished material made of a multi-layered material with a foamed core and exterior layers. On their respective exteriors they are covered with the decorative layer and, together with this, are reshaped into shaped elements to form an exterior contour and interior impressions for hollow spaces and are cut. The shaped elements are glued together over the entire surface or a part thereof in the edge area at their backs.

16 Claims, 1 Drawing Sheet

SUN VISOR FOR VEHICLES

Customarily, sun visors for vehicles comprise a base body, including a reinforcement which receives a pivot shaft and a pivot bearing, and a decorative element with which the base body is covered. In this case the decorative element is designed to be weldable for providing the continuous adhesion of the decorative blank by means of welding, such as high-frequency welding, ultrasonic welding or friction welding.

In addition, a sun visor for vehicles is known from DE 21 02 917 A1 which comprises a panel, wherein the panel is a flat piece made from a viscoplastic foamed plastic material, whose edge zone consists of a considerably denser mostly non-foamed layer of this plastic material.

A sun visor for vehicles is furthermore known from DE 91 10 948 U which comprises two foamed pad bodies. Stiffening elements are inserted into the pad bodies. The pad bodies are covered with a decorative layer which is bent over the edge area and suspended in protrusions on the back of the pad bodies. The pad bodies are connected at their backs.

The previous sun visors require a special tool for producing and shaping the base body and furthermore require stiffening elements and special blanks of decorative material matched to the shape of the base body, which then must be applied to the base body in a separate process and fastened there.

It is the object of the invention to provide a sun visor whose structural design provides the prerequisites for employing cut-up materials of covering elements as the basic material which already have an inherent stiffness per se, and to recite a process which permits the production of sun visors from these materials.

The application of a decorative layer on both sides of the sun visor is achieved by using two shaped elements formed from a panel-like semi-finished product made of several layers, which are covered with a decorative layer on the flat side of their respective exterior and connected on their backs which are free of decoration. The required mechanical stiffness of the sun visor is achieved without additional stiffening elements by the multi-layered material in so-called sandwich construction. The cutting of hollow spaces for receiving insert elements is made easier in that these hollow spaces can initially be impressed separately so that complicated shapes of the hollow spaces can also be produced and the inserts can possibly be installed prior to putting the shaped elements together. The edges of the shaped elements can be covered without a transition and uniformly by bending the decorative layer over, the same as the two flat sides of the sun visor. This results in a clean, visually impeccable edge contour.

The decorative layer can be respectively bent over the entire continuous outer edge of the shaped elements, or the shaped elements can alternatively be connected by a continuous decorative layer at one long edge and folded together along this long edge, wherein the decorative layer is respectively only bent over the remaining continuous outer edges of the shaped elements.

The first variant results in a uniform exterior appearance, while the second variant is simpler to produce because, on the one hand, only a partial area of the edges need to be bent over and, on the other hand, the exact alignment of the shaped bodies in the course of the flat connection of their backs is predetermined by the decorative layer connecting the two shaped bodies.

The decorative layer can have a protrusion projecting past the final contour of the sun visor for forming the edge area, which is bent over and thermally or adhesively connected with the adjoining back of the shaped elements. Because of this the decorative layer rests tightly on the shaped element in the bent over area, too, and is permanently fixed in place.

Alternatively it is also possible for the shaped element to have a protrusion projecting past the final contour of the sun visor, which is altogether bent over and thermally connected with the adjoining back of the shaped element. In this case the thermally connected areas of the shaped element located in the bent-over edge area are uniformly reshaped to a predetermined thickness and joined.

With this embodiment it is possible to cut out or stamp out the semi-finished material and the decorative layer in one process step, and an additional reinforcement of the sun visor is achieved by means of bending the protruding part over. Reshaping the thermally connected areas of the shaped elements located in the edge areas to a predetermined thickness makes it possible to connect the two shaped elements on their backs without a thickening being created along the edges.

The foamed core of the panel-shaped semi-finished material is suitably made of polyurethane foam.

This material has thermoplastic properties and can be reshaped and also compressed in the course of being bent over by means of being acted on thermally and being acted on by pressure.

The outer layers of the panel-shaped semi-finished material can be constituted by plastic foils.

In this embodiment the sun visor can be recycled when the parts are subsequently reused.

Alternatively, the outer layers can also be formed by laminations with a layer structure of plastic foil—nonwoven layer—plastic foil.

A particularly great mechanical stiffness is achieved with this embodiment, so that a very small thickness of the foam core is sufficient.

The plastic foils can consist of polyethylene.

This thermoplastic material adapts itself smoothly when being bent over and in this way makes the shaping of the edges easier.

Synthetic or natural foil or textile material is suitable as a material for the decorative layer. This variety of materials is made possible because no suitability for high-frequency welding is required.

On its back the decorative layer can have a foam layer. By means of this the surface of the sun visor is soft and resilient when touched.

In a preferred embodiment of the sun visor the blank of the panel-shaped semi-finished material with the decorative layer is stamped from the same material as a shaped interior roof of the vehicle, preferably from cut-up materials.

In this way it is achieved that, besides a material-saving use of raw materials in the production of the vehicle and cost savings connected therewith, the sun visor has the identical structure of the roof trim and the same matching color. Furthermore a smaller amount of different materials is used in the interior of the vehicle, which has advantageous effects during a subsequent reuse of the plastic parts.

By means of the process in accordance with the current invention for producing a sun visor it is made possible to produce a sun visor from two panel-shaped pieces of semi-finished material with a decorative layer on all sides, which are only covered on respectively one side with a decorative layer. The identical material which is also used for producing the roof trim can be used. In this case there is the possibility of producing the roof trim and the sun visor in one process step.

Because of the employment of two pieces of panel-shaped semi-finished material it is possible to impress the hollow spaces for the inserts, namely for the shaft of the sun visor and the pivot bearing, from the direction of the decoration-free back of the panel-shaped pieces of semi-finished material, namely complementary in the two cut semi-finished pieces with backs which are mirror-reversed in respect to each other and formed into shaped elements. Undercuts can therefore also be produced, such as can be produced in a single-piece body only with an extremely large effort. In particular, in the course of assembling the visor it is possible in this case to embed parts, whose diameter has been enlarged, prior to the connection of the shaped elements.

The production of the edges is accomplished by bending the decorative layer over, wherein there is the option that the decorative layer alone projects past the final contour of the sun visor and is bent over by itself, or that the shaped element with the decorative layer projects past the final contour of the sun visor, and they are bent over together. With the first variant it is possible to connect the decorative layer thermally or adhesively with the back of the shaped pieces, while with the second variant the protrusion with the adjoining back of the respective shaped piece is reshaped to a predetermined thickness and thermally connected. In the process the protrusion is compressed thermally and under pressure, is bent over and again compressed thermally and under pressure, bent over and again compressed thermally and under pressure with the adjoining back of the shaped element without it being necessary to displace excess material. A thermal connection is created by melting.

The two panel-shaped pieces of semi-finished material are preferably stamped out together simultaneously with the roof trim of the vehicle from the initial material, preferably from the area of a sliding roof.

Thus the panel-shaped pieces of semi-finished material with the decorative layer are produced simultaneously with the production of the roof trim. Two advantages over the practice up to now are connected with this. For one, the separate production of the base body for the sun visor is omitted and, on the other hand, cut-up material is utilized, in this case the area of the sliding roof. Up to now it was not possible to use this valuable material during the production, at most it could be returned to the raw material cycle as a recycling material.

Further developments and advantageous embodiments of the invention ensue from the claims, the further description and the drawings, in which the invention is explained.

Figure 2:
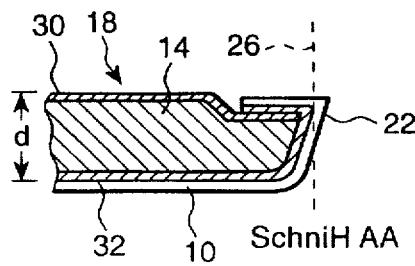
Figure 3:
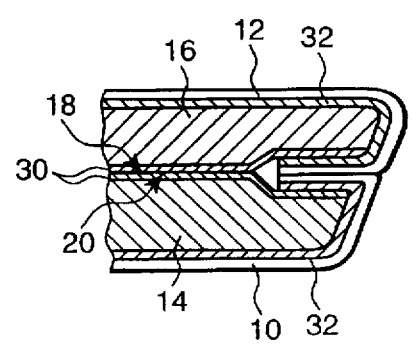

Shown in the drawings are in:

FIG. 1, a perspective view of a not yet processed panel-shaped piece of semi-finished material, FIG. 2, a section in the direction AA of FIG. 1, in which the protrusion has been bent over, however, and FIG. 3, the edge area of a finished sun visor with two shaped elements bent over in the edge area and glued together.

FIG. 1 represents a perspective view of a panel-shaped piece of semi-finished material, whose visible side is the back 18. The front, here located at the bottom, is covered with a decorative layer 10. The panel-shaped piece of semi-finished material comprises a foamed plastic core into which impressions 24 in the form of hollow spaces for receiving inserts have been made.

The final contour of the shaped elements 14 of the sun visor is indicated in FIG. 1 by a dashed line in the edge area of the panel-shaped piece of semi-finished material. The blank represented here has a protrusion 22 which is bent over and thermally connected with the then adjoining back 18 of the shaped element 14.

This state is shown in FIG. 2 in the section along the section line AA. Originally the panel-shaped piece of semi-finished material with the decorated layer 10 continued toward the right. The protrusion 22 was compressed under thermal action and pressure action along a bending edge 26 and bent over by approximately 180 degrees, so that the back of the protrusion 22 comes to rest on the back 18 of the flat, i.e. not bent part. The connected areas of the piece of semi-finished material were then acted on by thermal effects and pressure effects until the decorated layer 10 and the connected areas of the piece of semi-finished material have been altogether compressed to a predetermined thickness d.

As represented in FIG. 1, the shaped element 14 with the decorative layer 10 is connected with a further shaped element with a decorative layer which was formed mirror-reversed to produce a complete sun visor.

This state is shown as a cutout in FIG. 3. The lower area of this representation corresponds to that in FIG. 2. However, in FIG. 3 there is also an upper shaped element 16 with a decorative layer 12 which had been bent over analogously to the lower shaped element 14 with the decorative layer 10. Since in both cases the edge areas have been compressed to a predetermined thickness d, both shaped elements have a predetermined thickness and can therefore be glued together on the flat side or also only partially on the flat side in the edge area. The connection or gluing takes place here at the backs 18 and 20, which are free of decoration, of the shaped elements 14 and 16.

The shaped elements 14 and 16 consist of a multi-layer material with a foamed core and exterior layers (30,32), wherein the exterior layers can be either plastic foils or laminations with a layer structure of plastic foil - nonwoven layer - plastic foil. Polyurethane foam is preferably used as the foam material and polyethylene as the material for the plastic foils.

What is claimed is:

1. A motor vehicle sun visor which is functionally adapted for construction from recycled motor vehicle roof materials comprising:

a first multi-layered, panel-shaped substrate part having inherent stiffness and having a decorative face surface, a decorative edge, and a decoration-free back, and a second multi-layered, panel-shaped substrate part having inherent stiffness and having a second decorative face surface, a second decorative edge, and a second decoration-free back, wherein said first and second substrate parts are each in sandwich construction and each comprise:

an inner core layer of foam, a first exterior layer which overlays said inner core layer and forms said decoration-free back of said first substrate part, a second exterior layer which overlays said inner core layer opposite to said first exterior layer, and a decorative layer which overlays said second exterior layer opposite to said inner core layer and forms said decorative face surface and decorative edge of said second substrate part, wherein said first and second substrate parts are bonded together at said first and second decoration-free backs so that said first and second decorative face surfaces and edges of said first and second parts are outwardly exposed, and wherein said first and second substrate parts are functionally adapted and thermally shaped to receive sun visor inserts.

2. A sun visor according to claim 1, wherein said first and second decorative edges are each entirely continuous edges around said parts.

3. A sun visor according to claim 1, wherein said first and second panel-shaped substrate parts each have a long edge and a remaining edge portion, and said first and second decorative layers together form a continuous connecting decorative edge at said long edges which connects said first and second panel-shaped substrate parts, and said first and second decorative layers are each continuous at said remaining edge portion and do not form a continuous connecting decorative edge and do not connect said first and second panel-shaped substrate parts.

4. A sun visor according to claim 1, wherein said first and second decorative edges of said first and second substrate parts have each been prepared by (1) bending over a protrusion of said decorative layer onto said substrate decoration-free back to form said decorative edge, and (2) adhesively or thermally bonding said bent-over decorative layer to said decoration-free back to form said substrate part.

5. A sun visor according to claim 1, wherein said first and second decorative edges of said first and second substrate parts have each been prepared by (1) bending over a protrusion of said inner core layer, said exterior layers, and said decorative layer onto said decoration-free back to provide a decorative edge having a predetermined thickness at said decorative edge, and (2) thermally bonding said bent-over protrusion to said decoration-free back to form said substrate part.

6. A sun visor according to claim 1, wherein said inner core layer of foam comprises a polyurethane foam.

7. A sun visor according to claim 1, wherein said first and second exterior layers comprise plastic foils.

8. A sun visor according to claim 1, wherein said first and second exterior layers comprise a laminated structure which includes plastic foil, nonwoven layer, and plastic foil.

9. A sun visor according to claim 7, wherein said plastic foils comprise polyethylene.

10. A sun visor according to claim 1, wherein said decorative layer comprises a synthetic or natural foil or textile material.

11. A sun visor according to claim 10, wherein said decorative layer has a back and comprises a foam layer on said decorative layer back.

12. A sun visor according to claim 1, wherein said first and second substrate parts have each been shaped from a motor vehicle roof trim base material.

13. A process for preparing a motor vehicle sun visor which is functionally adapted for construction from recycled motor vehicle roof materials comprising:

shaping a first multi-layered base material into a first panel-shaped substrate part having inherent stiffness and having a first decorative face surface, a first decorative edge, and a first decoration-free back, and shaping a second multi-layered base material into a second panel-shaped part having inherent stiffness and having a second decorative face surface, a second decorative edge, and a second decoration-free back, wherein said shaped substrate parts are functionally adapted and shaped with one or more impressions to receive at least one sun visor insert, wherein said first and second shaped substrate parts are each in sandwich construction and each comprise:

an inner core layer of foam, a first exterior layer which overlays said inner core layer and forms said decoration-free back if each substrate part, a second exterior layer which overlays said inner core layer opposite to said first exterior layer, and a decorative layer which overlays said second exterior layer opposite to said inner core layer and forms said decorative face surface and decorative edge of each substrate part, inserting at least one sun visor insert into said impressions, and bonding together said first and second shaped substrate parts at said decoration-free backs so that said decorative face surfaces and edges of said parts are outwardly exposed.

14. A process according to claim 13, further comprising the steps of:

cutting each of said first and second base materials so that said decorative layer forms a protrusion which projects past said foam core and past said first and second exterior layers, and bending over said protrusion of decorative layer to form said decorative edge, and bonding said bent-over protrusion to said decoration-free back.

15. A process according to claim 13, further comprising the steps of:

bending over a protrusion in each of said first and second base materials onto said decoration-free back, thermally connecting said bent-over protrusion to said decoration-free back, further reshaping said bent-over protrusion to yield said decorative edge having a predetermined thickness.

16. A process according to claim 13, wherein said base material comprises a roof trim material from a motor vehicle.

* * * * *